(12) United States Patent
Matsumoto et al.

(10) Patent No.: US 9,201,198 B2
(45) Date of Patent: Dec. 1, 2015

(54) INCLINED SURFACE-EQUIPPED LENS

(71) Applicant: ALPS ELECTRIC CO., LTD., Tokyo (JP)

(72) Inventors: Tsuyoshi Matsumoto, Niigata-ken (JP); Noriyuki Tamai, Niigata-ken (JP); Masanori Takasaka, Niigata-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 13/850,921

(22) Filed: Mar. 26, 2013

(65) Prior Publication Data
US 2013/0279851 A1 Oct. 24, 2013

(30) Foreign Application Priority Data
Apr. 18, 2012 (JP) .................. 2012-094339

(51) Int. Cl.
| G02B 6/32 | (2006.01) |
| G02B 3/02 | (2006.01) |
| G02B 6/42 | (2006.01) |
| G02B 3/00 | (2006.01) |
| B29D 11/00 | (2006.01) |

(52) U.S. Cl.
CPC *G02B 6/327* (2013.01); *G02B 3/02* (2013.01); *G02B 6/4206* (2013.01); *G02B 6/4207* (2013.01); *B29D 11/00692* (2013.01); *C03B 2215/49* (2013.01); *G02B 3/0031* (2013.01); *G02B 2003/0093* (2013.01)

(58) Field of Classification Search
CPC .... G02B 6/327; G02B 6/4207; G02B 3/0031; G02B 2003/0093; G02B 3/02; C02B 2215/49

USPC .......................................................... 385/93
See application file for complete search history.

(56) References Cited

U.S. PATENT DOCUMENTS

| 5,221,839 | A | * | 6/1993 | Braun .................. 250/227.24 |
| 5,689,374 | A | * | 11/1997 | Xu et al. ................... 359/652 |
| 6,476,973 | B1 | * | 11/2002 | Ludington ............... 359/642 |
| 6,633,701 | B2 | * | 10/2003 | Li et al. .................... 385/34 |
| 6,870,988 | B2 | * | 3/2005 | Liu ............................ 385/34 |
| 6,901,186 | B2 | * | 5/2005 | Fukuzawa ................ 385/34 |
| 7,421,161 | B2 | * | 9/2008 | Furuichi et al. ............ 385/34 |
| 8,538,208 | B2 | * | 9/2013 | Ho et al. .................... 385/31 |
| 2002/0094162 | A1 | * | 7/2002 | Li et al. .................... 385/34 |
| 2002/0181865 | A1 | * | 12/2002 | Jang et al. ................. 385/34 |

(Continued)

FOREIGN PATENT DOCUMENTS

| CN | 101236293 | 8/2008 |
| JP | 61-087112 | 5/1986 |

(Continued)

OTHER PUBLICATIONS

Office Action in Chinese Application No. 201310081237.2 dated Sep. 3, 2014.

*Primary Examiner* — Michelle R Connelly
(74) *Attorney, Agent, or Firm* — Beyer Law Group LLP

(57) ABSTRACT

An inclined surface-equipped lens includes a first inclined surface and a second inclined surface inclined relative to a plane perpendicular to an optical axis, and a corner portion formed by the first inclined surface and the second inclined surface being in contact with each other. Each inclined surface makes a predetermined inclination angle with the plane perpendicular to the optical axis, and the corner portion is located out of the optical axis and raised outward.

7 Claims, 5 Drawing Sheets

(56) References Cited

U.S. PATENT DOCUMENTS

| | | |
|---|---|---|
| 2003/0063853 A1* | 4/2003 | Huang et al. .................. 385/34 |
| 2003/0081897 A1* | 5/2003 | Itoh et al. ..................... 385/34 |
| 2008/0044135 A1* | 2/2008 | Furuichi et al. ............... 385/34 |
| 2008/0180815 A1 | 7/2008 | Yamagata et al. |

FOREIGN PATENT DOCUMENTS

| | | | |
|---|---|---|---|
| JP | 61087112 A | * | 5/1986 |
| JP | 2003161812 A | * | 6/2003 |
| JP | 2005338221 A | * | 12/2005 |
| JP | 4214694 | | 1/2009 |

* cited by examiner

INCLINED SURFACE-EQUIPPED LENS

CLAIM OF PRIORITY

This application claims benefit of Japanese Patent Application No. 2012-094339 filed on Apr. 18, 2012, which is hereby incorporated by reference.

BACKGROUND OF THE INVENTION

1. Field of the Invention

The present invention relates to a lens coupled to an optical fiber, and particularly relates to an inclined surface-equipped lens having an inclined surface that is inclined relative to a plane perpendicular to an optical axis.

2. Description of the Related Art

In an optical communication module, a lens is used for coupling light from a light-emitting element to an optical fiber.

In such a case, it is known to reduce reflected return light from an end surface of the optical fiber to the light-emitting element. As a method for reducing the reflected return light, Japanese Unexamined Patent Application Publication No. 61-87112 discloses an optical communication module in which an obliquely-cut surface of an optical fiber and a lens whose surface facing the obliquely-cut surface of the optical fiber is partially or entirely inclined are abutted and fixed to each other by means of an adhesive or the like.

As a method for manufacturing such a lens having an inclined surface, it is known that a lens material is heated in a body mold and press-molded with a mold having an inclined surface. Japanese Patent No. 4214694 discloses an inclined surface-equipped cylindrical lens having an inclined surface that includes in its part a surface substantially parallel to a plane perpendicular to an optical axis, as a countermeasure against a crack or the like occurring during press molding.

As shown in FIG. 10, in an optical communication module 500 disclosed in Japanese Unexamined Patent Application Publication No. 61-87112, a cylindrical holder 504 retains a rod-shaped lens 501 and an optical fiber 502 at its center. An end face 501a of the rod-shaped lens 501 and an end face 503a of a cladding 503 including an end face of a core 502a of the optical fiber 502 are abutted and fixed to each other via an optical adhesive such that their optical axes 505 coincide with each other. In this case, a portion of the end face of the rod-shaped lens 501 is an inclined surface. In addition, a portion of the end face that is not the inclined surface is a surface 501b perpendicular to the optical axis 505. It should be noted that the rod-shaped lens 501 is used for introducing light into the core 502a of the optical fiber 502 or outputting light from the optical fiber 502.

As shown in FIG. 11, an inclined surface-equipped cylindrical lens 600 disclosed in Japanese Patent No. 4214694 is a lens having an inclined surface 601. Reference numeral 603 denotes a spherical surface or an aspherical surface, and reference numeral 604 denotes an optical axis corresponding to the central axis of the lens having the spherical surface or the aspherical surface. The inclined surface-equipped cylindrical lens 600 has the inclined surface 601 that includes in its part a surface 602 substantially parallel to a plane perpendicular to the optical axis 604.

Specifically, in Japanese Unexamined Patent Application Publication No. 61-87112 and Japanese Patent No. 4214694, as shown in FIG. 12, a portion of the lens end face is an inclined surface 700a, and another portion of the lens end face is a surface 700b substantially parallel to a plane perpendicular to the optical axis. For that, a lens material 705 is heated, and press-molded with a lower mold 702 that has a surface 702a inclined relative to an optical axis 706 and a surface 702b perpendicular to the optical axis 706, as shown in FIG. 13. At that time, the surface 702a inclined relative to the optical axis 706 applies a pressing pressure 702d to the lens material 705 in a direction perpendicular to the optical axis 706.

Thus, as shown in FIG. 13, the lens material 705 spews out to the gaps between a body mold 703 and molds 701 and 702 on the side (Y1 direction side) on which the pressing pressure 702d is applied in the direction perpendicular to the optical axis 706, thereby forming protrusions 700c. As a result, during cooling, due to contraction, the protrusions 700c fit into the gaps between the molds 701 and 702 and the body mold 703. Thus, the lens 700 may not be released from the mold. In addition, the protrusion 700c of the lens 700 may be chipped off during mold release or transport, and a crack may occur from the chipped portion.

SUMMARY OF THE INVENTION

The present invention has been made in view of such problems and provides an inclined surface-equipped lens in which spewing-out of a lens material is suppressed during press molding and thus a chip or a crack does not occur.

An inclined surface-equipped lens according to the present invention includes: a first inclined surface and a second inclined surface inclined relative to a plane perpendicular to an optical axis; and a corner portion formed by the first inclined surface and the second inclined surface being in contact with each other. Each inclined surface makes a predetermined inclination angle with the plane perpendicular to the optical axis. The corner portion is located out of the optical axis and raised outward.

With such an aspect, when a lens material is press-molded, the direction of a pressing pressure is allowed to be substantially parallel to the optical axis. Thus, it is possible to restrain the lens material from spewing out to a gap between a body mold and a mold, and occurrence of a chip or a crack is prevented.

Thus, according to the present invention, it is possible to provide an inclined surface-equipped lens in which spewing-out of a lens material is suppressed during press molding and thus a chip or a crack does not occur.

A light beam passing through the first inclined surface or the second inclined surface is preferably located only within either the first inclined surface or the second inclined surface.

With such an aspect, the light beam is prevented from being incident on the first inclined surface and the second inclined surface and outputted in different directions. Thus, it is possible to efficiently optically couple the light beam to an optical fiber.

When the areas of the first inclined surface and the second inclined surface are different from each other, the inclination angle of one inclined surface having a larger area among the first inclined surface and the second inclined surface is preferably lower than that of the other inclined surface.

The pressing pressure is likely to be applied in a direction perpendicular to the inclined surface, and thus the inclined surface having a higher inclination angle applies a greater pressing pressure in a direction perpendicular to the optical axis. Therefore, decreasing the inclination angle of the inclined surface having a larger area is suitable for restraining the lens material from spewing out.

A light beam passing through the first inclined surface or the second inclined surface is preferably located only within the inclined surface having a larger area among the first inclined surface and the second inclined surface.

With such an aspect, it is possible to fix, to the inclined surface, an optical fiber whose end face is obliquely cut. Thus, the workability is good when fixing the optical fiber to the inclined surface.

An outer shape formed in a direction perpendicular to the optical axis is preferably rectangular. With such an aspect, when mounting the inclined surface-equipped lens to an optical module, it is possible to place the inclined surface-equipped lens in a flat manner. Thus, it is easy to mount the lens to the optical module.

An inclined surface having a lower inclination angle among the first inclined surface and the second inclined surface is preferably fixed to an obliquely-cut surface of an optical fiber.

With such an aspect, it is possible to provide an optical module which uses an inclined surface-equipped lens in which spewing-out of a lens material is suppressed during press molding and thus a chip or a crack does not occur.

DESCRIPTION OF THE PREFERRED EMBODIMENTS

With regard to an inclined surface-equipped lens shown in each drawing, a Y direction is the right-left direction; a Y1 direction is the left direction; a Y2 direction is the right direction; an X direction is the front-back direction; an X1 direction is the front direction; and an X2 direction is the back direction. In addition, the direction perpendicular to both the X direction and the Y direction is the up-down direction (a Z direction; the height direction), a Z2 direction is the upward direction, and a Z1 direction is the downward direction. It should be noted that for clarity, each drawing is shown such that the dimensions are changed as appropriate.

Figure 1:
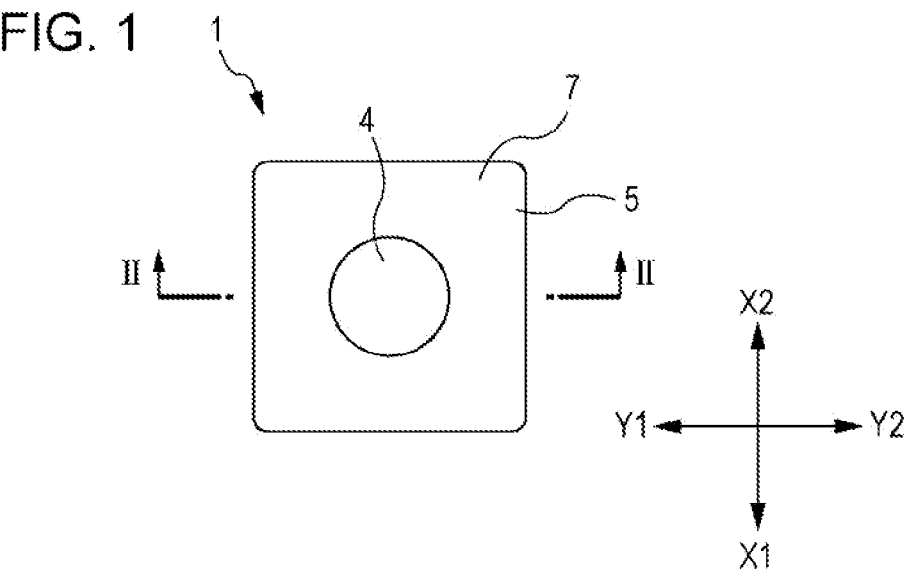
FIG. 1 is a schematic plan view of an inclined surface-equipped lens according to an embodiment.
Figure 2:
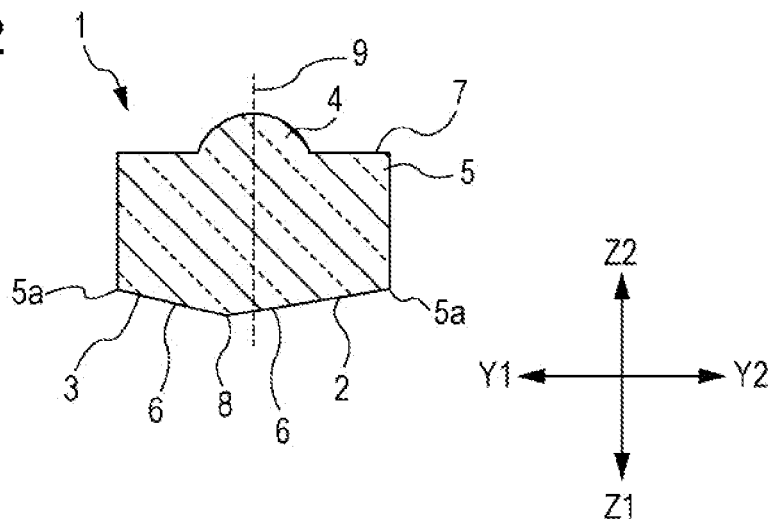
FIG. 2 is a schematic cross-sectional view taken along the II-II line shown in FIG. 1.
Figure 3:
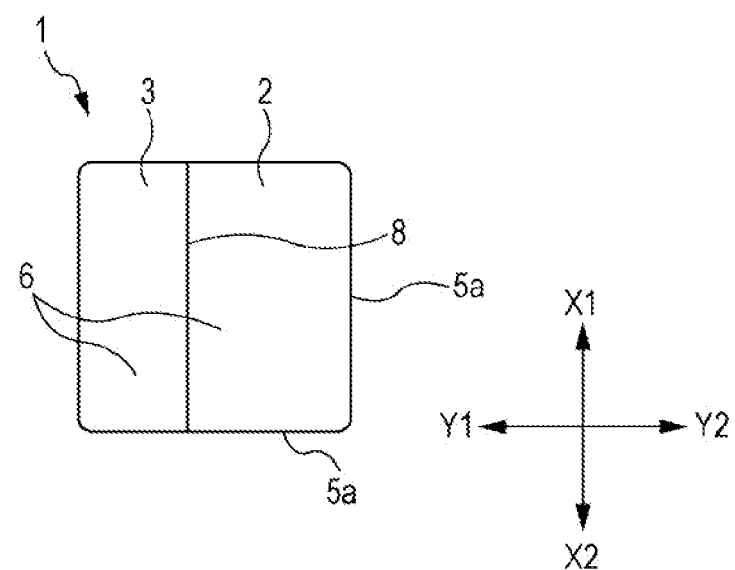
FIG. 3 is a schematic plan view of the inclined surface-equipped lens according to the embodiment, as viewed from below.

An embodiment will be described in detail with reference to the drawings. FIG. 1 is a schematic plan view of an inclined surface-equipped lens 1 according to the embodiment. FIG. 2 is a schematic cross-sectional view of the inclined surface-equipped lens 1 taken along the II-II line shown in FIG. 1. FIG. 3 is a schematic plan view of the inclined surface-equipped lens 1, as viewed from blow the downward (Z1) direction.

As shown in each drawing, the inclined surface-equipped lens 1 according to the embodiment includes a base 5 formed in substantially a square prism shape, an aspherical lens 4 provided on an upper end face 7 of the base 5 in the upward (Z2) direction, and a first inclined surface 2 and a second inclined surface 3 provided in a lower end face 6 of the base 5 in the downward (Z1) direction.

In the embodiment, the aspherical lens 4 is provided on the upper end face 7 of the base 5 in the upward direction. However, the embodiment is not limited thereto, and an optical function surface such as a spherical lens may also be provided.

In the embodiment, the shape of the base 5 is substantially the square prism shape, but is not limited thereto. Another shape such as a polygonal prism shape may also be used.

As shown in FIG. 2, each of the first inclined surface 2 and the second inclined surface 3 is formed so as to be inclined relative to a plane perpendicular to an optical axis 9. In addition, a corner portion 8 is formed between both inclined surfaces 2 and 3, and both inclined surfaces 2 and 3 are in contact with each other via the corner portion 8. The corner portion 8 is raised outwardly, namely, in the downward (Z1) direction, and a cross-section of the inclined surface-equipped lens 1 has a mountain shape having the corner portion 8 as a peak. The corner portion 8, which is the peak of the mountain shape, is formed at a position out of the optical axis 9.

As shown in FIG. 3, the area of the first inclined surface 2 is larger than that of the second inclined surface 3. As shown in FIG. 2, the first inclined surface 2 is less inclined relative to the plane perpendicular to the optical axis 9 than the second inclined surface 3.

A method for manufacturing the inclined surface-equipped lens 1 will be described with reference to FIGS. 4A to 4D. In a step shown in FIG. 4A, a press apparatus 40 is prepared. The press apparatus 40 includes a body mold 43, an upper mold 41 having a shape for the aspherical lens, a lower mold 42 having a shape for the inclined surfaces, and a heater 44.

Figure 4A:
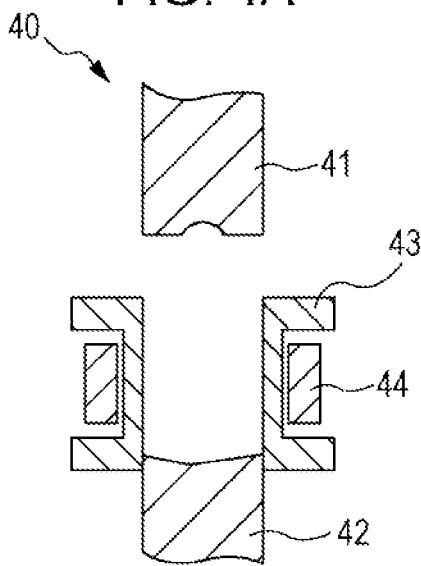
FIGS. 4A to 4D are diagrams illustrating a method for manufacturing the inclined surface-equipped lens according to the embodiment.
Figure 4B:
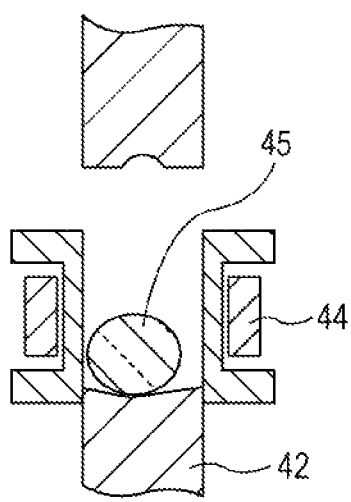

Next, in a step shown in FIG. 4B, a lens material 45 is inserted through an opening and placed on the lower mold 42. Then, the lens material 45 is heated by the heater 44 to a temperature equal to or higher than the softening point of the lens material 45. In the embodiment, the lens material 45 is a glass material, but is not limited to the glass material. A resin material or the like may also be used.

Next, in a step shown in FIG. 4C, the lens material 45 is pressed by the upper mold 41 and the lower mold 42 from above and below. As a result, mold shapes of the upper mold 41 and the lower mold 42 are transferred to the lens material 45, whereby the inclined surface-equipped lens 1 is formed.

Figure 4C:
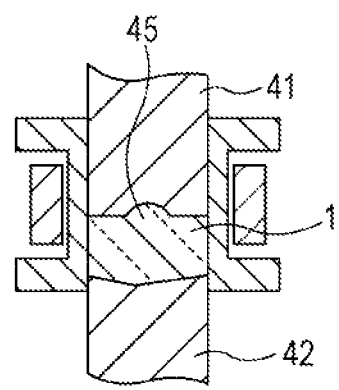
Figure 4D:
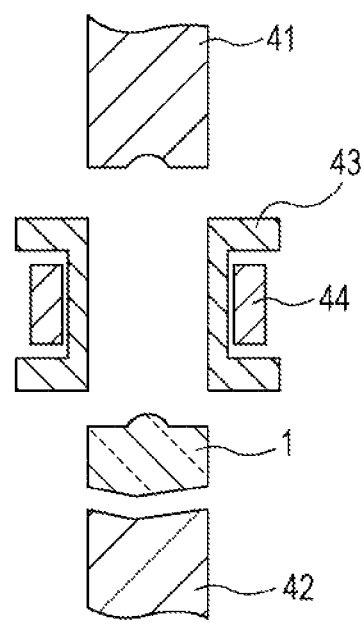

Next, in a step shown in FIG. 4D, the heater 44 is turned off, and the inclined surface-equipped lens 1 is cooled to a predetermined temperature. Then, the upper mold 41 and the lower mold 42 are pulled out from the body mold 43, and the inclined surface-equipped lens 1 is released from the upper mold 41 and the lower mold 42, whereby the inclined surface-equipped lens 1 is produced.

Figure 10:
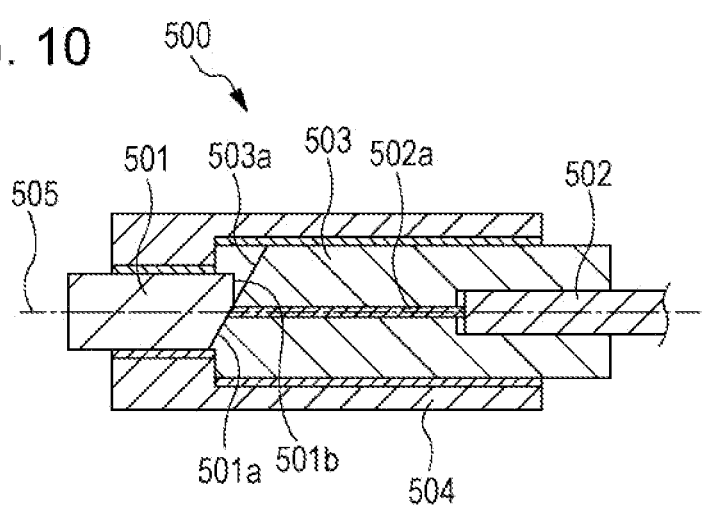
FIG. 10 is a schematic cross-sectional view of an optical communication module disclosed in Japanese Unexamined Patent Application Publication No. 61-87112.
Figure 11:
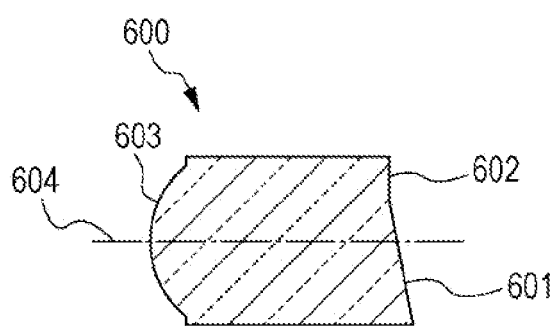
FIG. 11 is a schematic cross-sectional view of an inclined surface-equipped cylindrical lens disclosed in Japanese Patent No. 4214694.

In the lenses 501 and 600 in the related art disclosed in Japanese Unexamined Patent Application Publication No. 61-87112 and Japanese Patent No. 4214694, as shown in FIGS. 10 and 11, one end face is composed of the surface 501a or 601 inclined relative to the optical axis 505 or 604 and the surface 501b or 602 perpendicular to the optical axis 505 or 604.

Figure 12:
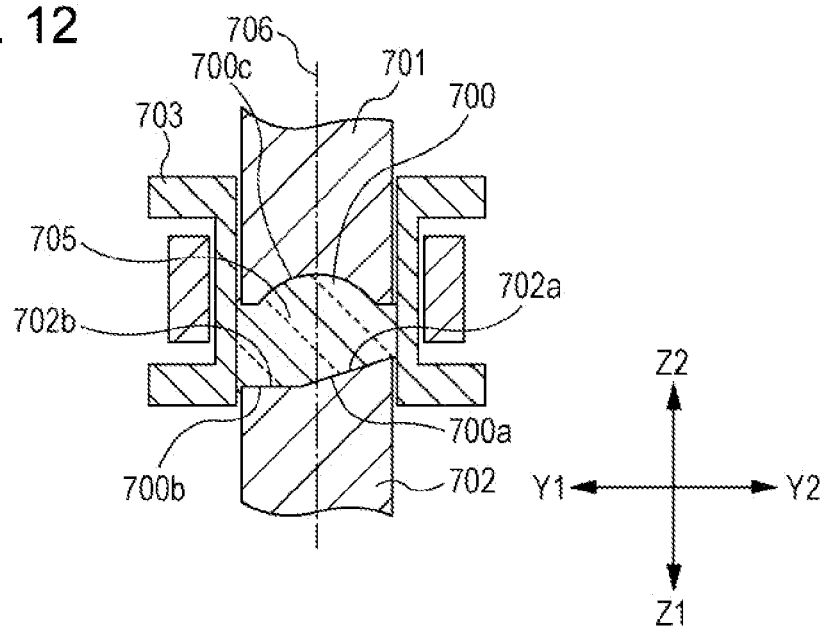
FIG. 12 is a diagram illustrating a pressing method for a lens of the related art.
Figure 13:
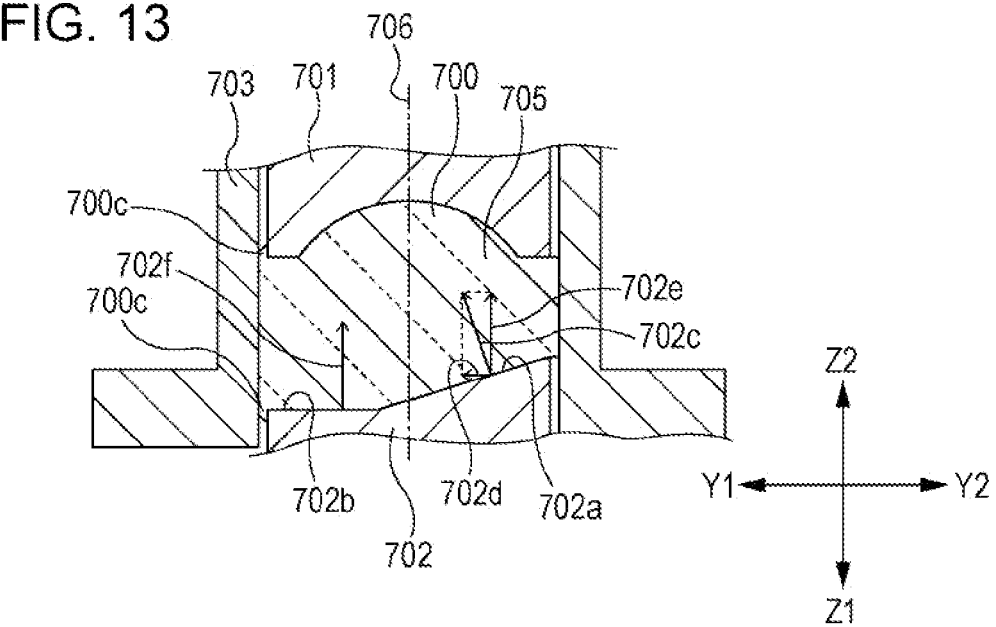
FIG. 13 is a partially enlarged view of FIG. 12.

Thus, in the related art, as shown in FIGS. 12 and 13, in the step in which the lens material 705 is pressed by the upper mold 701 and the lower mold 702 from above and below (the Z direction), the lower mold 702 is used which has the surface 702a inclined relative to the optical axis 706 of the lens 700 (the Z direction) and the surface 702b perpendicular to the optical axis 706 of the lens 700.

Thus, as shown in FIG. 13, when the lens material 705 is pressed, a pressing pressure obtained by combining a pressing pressure 702c in a direction perpendicular to the surface 702a and a pressing pressure 702f in a direction perpendicular to the surface 702b is applied to the lens material 705 from below (the Z1 direction). Accordingly, a pressing pressure in the upward (Z2) direction which is the sum of the pressing pressure 702f and a component 702e of the pressing pressure 702c in a direction parallel to the optical axis 706, and a pressing pressure 702d in the left (Y1) direction which is a component of the pressing pressure 702c in a direction perpendicular to the optical axis 706, are applied to the lens material 705. As a result, the lens material 705 is pressed in the left direction by the pressing pressure 702d, and spews out to the gaps located in the left direction between the body mold 703 and the upper mold 701 and the lower mold 702, to form the protrusions 700c.

As a result, in a cooling process (a step in the related art corresponding to FIG. 4D), the lens material 705 contracts and thus the protrusions 700c of the lens material 705 compress the upper mold 701 and the lower mold 702. Therefore, tension is applied to the protrusions 700c of the lens material 705 from both molds 701 and 702.

Thus, since the protrusions 700c of the lens material 705 are in close contact with the both molds 701 and 702, the lens 700 may not be released from both molds 701 and 702 in the step in the related art corresponding to FIG. 4D.

In addition, when the lens 700 is released from both molds 701 and 702, the protrusions 700c of the lens material 705 may be chipped off. In some cases, a crack occurs in the lens 700 from the chipped portion. Furthermore, a broken piece occurs due to the chipping. In the related art, the optical performance of the lens 700 may deteriorate due to the chipping, the crack, the broken piece, or the like having occurred thus.

Moreover, during transfer of the lens 700, the protrusions 700c of the lens 700 may be chipped off. In some cases, a crack occurs in the lens 700 from the chipped portion.

In order to prevent the upper mold 701 from contracting in the cooling process to compress and squeeze an optical function surface of the lens 700, materials are generally selected such that the thermal expansion coefficients of both molds 701 and 702 are lower than the thermal expansion coefficient of the lens material 705. Thus, in the cooling process, the lens material 705 contracts more greatly than the both molds 701 and 702.

Figure 5:
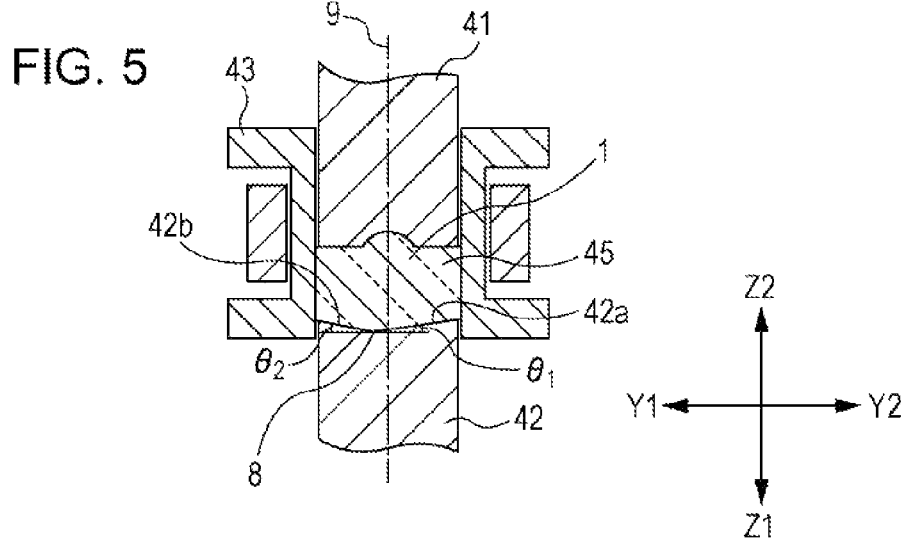
FIG. 5 is a diagram illustrating a pressing method for the inclined surface-equipped lens according to the embodiment.
Figure 6:
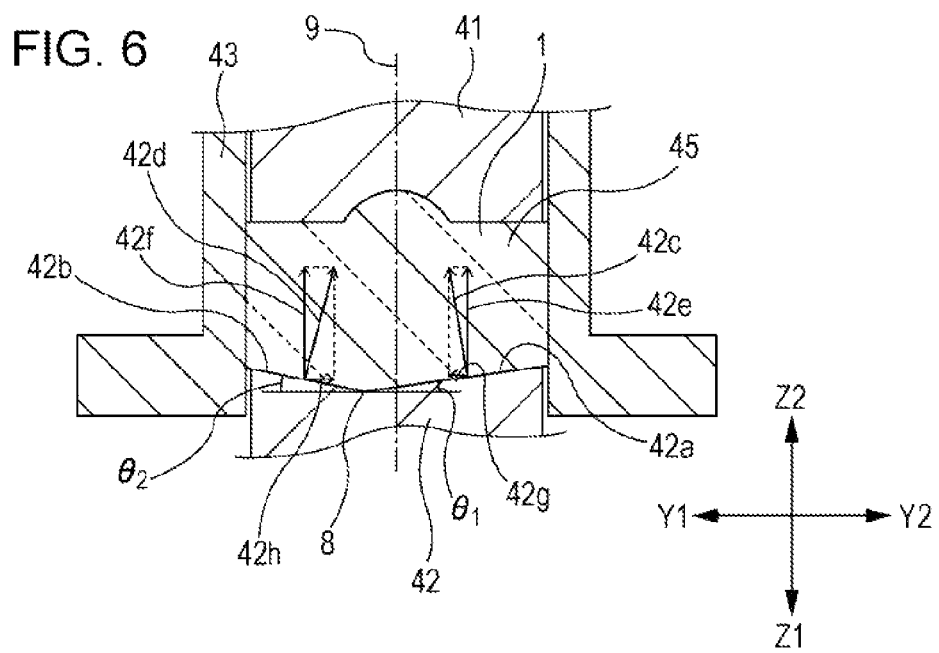
FIG. 6 is a partially enlarged view of FIG. 5.

In view of such a problem, in the embodiment, the lower mold 42 is used which has a third inclined surface 42a and a fourth inclined surface 42b which are inclined relative to the optical axis 9 of the inclined surface-equipped lens 1 (the Z direction) as shown in FIGS. 5 and 6. The third inclined surface 42a and the fourth inclined surface 42b are inclined so as to face each other.

Thus, in the step shown in FIG. 4C, a pressing pressure obtained by combining a pressing pressure 42c in a direction perpendicular to the third inclined surface 42a and a pressing pressure 42d in a direction perpendicular to the fourth inclined surface 42b is applied to the lens material 45 from below (the Z1 direction) as shown in FIG. 6. Therefore, a pressing pressure in the upward (Z2) direction and a pressing pressure in the right-left (Y) direction are applied to the lens material 45.

With regard to the pressing pressure in the upward (Z2) direction, a pressing pressure 42e and a pressing pressure 42f are applied from the third inclined surface 42a and the fourth inclined surface 42b in the same direction, namely, in the upward (Z2) direction. With regard to the pressing pressure in the right-left (Y) direction, a pressing pressure 42g is applied from the third inclined surface 42a in the left (Y1) direction, and a pressing pressure 42h is applied from the fourth inclined surface 42b in the right (Y2) direction. These pressing pressures 42g and 42h are applied in the opposite directions, and thus are cancelled and reduced. As a result, the pressing pressure is applied in the upward (Z2) direction and substantially parallel to the optical axis.

Thus, the lens material 45 is restrained from being pressed in the right-left direction. As a result, the lens material 45 is restrained from spewing out to the gaps between the body mold 43 and the upper mold 41 and the lower mold 42, and a chip or a crack is prevented from occurring.

Since the lens material 45 is pressed by the lower mold 42 having the third inclined surface 42a and the fourth inclined surface 42b, the first inclined surface 2 and the second inclined surface 3 are formed in the inclined surface-equipped lens 1. Since the third inclined surface 42a and the fourth inclined surface 42b face each other, the first inclined surface 2 and the second inclined surface 3 form a mountain-shaped cross section which has the corner portion 8 as a peak and is raised in the downward (Z1) direction as shown in FIG. 2. In other words, since the first inclined surface 2 and the second inclined surface 3 are in contact with each other, the corner portion 8 is formed.

The angles of the third inclined surface 42a and the fourth inclined surface 42b relative to the up-down (Z) direction, namely, a horizontal plane perpendicular to the optical axis 9, that is, the inclination angles of the third inclined surface 42a and the fourth inclined surface 42b, are represented by $\theta 1$ and $\theta 2$, respectively, as shown in FIGS. 5 and 6. In addition, the areas of the third inclined surface 42a and the fourth inclined surface 42b are represented by S1 and S2, respectively. The pressing pressures 42c and 42d of the third inclined surface 42a and the fourth inclined surface 42b applied to the lens material 45 (in the directions perpendicular to the inclined surfaces 42a and 42b) when the lens material 45 is pressed in the step shown in FIG. 4C are set, for example, so as to be the same, and their magnitudes are represented by P.

In this case, to the lens material 45, the third inclined surface 42a applies a force of $P \times S1 \times \cos(90° - \theta 1) = P \times S1 \times \sin \theta 1$ in the left (Y1) direction, and the fourth inclined surface 42b applies a force of $P \times S2 \times \cos(90° - \theta 2) = P \times S2 \times \sin \theta 2$ in the right (Y2) direction. In this manner, pressing pressures proportional to the sine values $\sin \theta 1$ and $\sin \theta 2$ of the inclination angles $\theta 1$ and $\theta 2$ are applied to the lens material 45 in the right-left (Y) direction.

Thus, in order that the forces in the right-left (Y) direction applied to the lens material 45 are cancelled, it is required that $S1 \times \sin \theta 1 = S2 \times \sin \theta 2$. Therefore, in the case where $S1 > S2$, it is required that sin θ1<sin θ2. In other words, in consideration of 0°<θ1 and θ2<90°, it is required that θ1<θ2. That is, in order that no force is applied to the lens material 45 in the right-left (Y) direction, the inclination angle of the inclined surface having a larger area is required to be lower than the inclination angle of the other inclined surface.

Thus, when it is taken into consideration that the first inclined surface 2 and the second inclined surface 3 are formed by the third inclined surface 42a and the fourth inclined surface 42b, respectively, the first inclined surface 2 having a larger area S1 in the inclined surface-equipped lens 1 preferably has a low inclination angle θ1.

Thus, as shown in FIGS. 2 and 3, the first inclined surface 2 having a larger area is formed to have a lower inclination angle than that of the second inclined surface 3 having a smaller area, thereby restraining the lens material from spewing out.

The inclined surface having a smaller area for chamfering or the like of a lens edge 5a applies a small force to the lens material 45 during pressing in the step shown in FIG. 4C. Thus, a limitation of the degree of inclination on the inclined surface having a smaller area is alleviated as compared to the inclined surface having a larger area.

The inclined surface-equipped lens 1 according to the embodiment has the two inclined surfaces, that is, the first inclined surface 2 and the second inclined surface 3, as shown in FIG. 3, but is not limited thereto. The inclined surface-equipped lens 1 may have three or more inclined surfaces.

Figure 7:
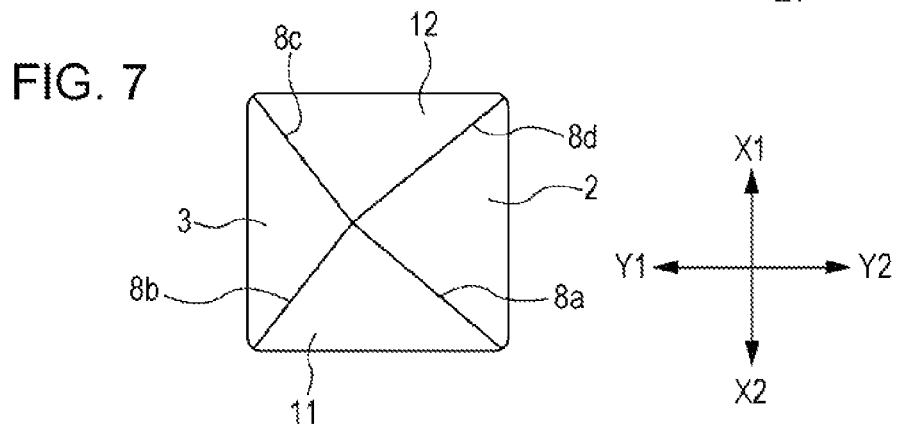
FIG. 7 is a schematic plan view of an inclined surface-equipped lens according to a modification of the embodiment, as viewed from below.

FIG. 7 shows a schematic plan view of an inclined surface-equipped lens according to a modification of the embodiment, as viewed from below. As shown in FIG. 7, the inclined surface-equipped lens according to the modification has four inclined surfaces 2, 3, 11, and 12. The first inclined surface 2 and the fifth inclined surface 11 are in contact with each other, the fifth inclined surface 11 and the second inclined surface 3 are in contact with each other, the second inclined surface 3 and the sixth inclined surface 12 are in contact with each other, and the sixth inclined surface 12 and the first inclined surface 2 are in contact with each other, thereby forming corner portions 8a, 8b, 8c, and 8d which are raised outward.

The first inclined surface 2 having a larger area is formed to have a lower inclination angle than the inclination angle of the second inclined surface 3. In addition, the areas of the fifth inclined surface 11 and the sixth inclined surface 12 are the same, and thus the fifth inclined surface 11 and the sixth inclined surface 12 are formed such that their inclination angles are the same.

Figure 8:
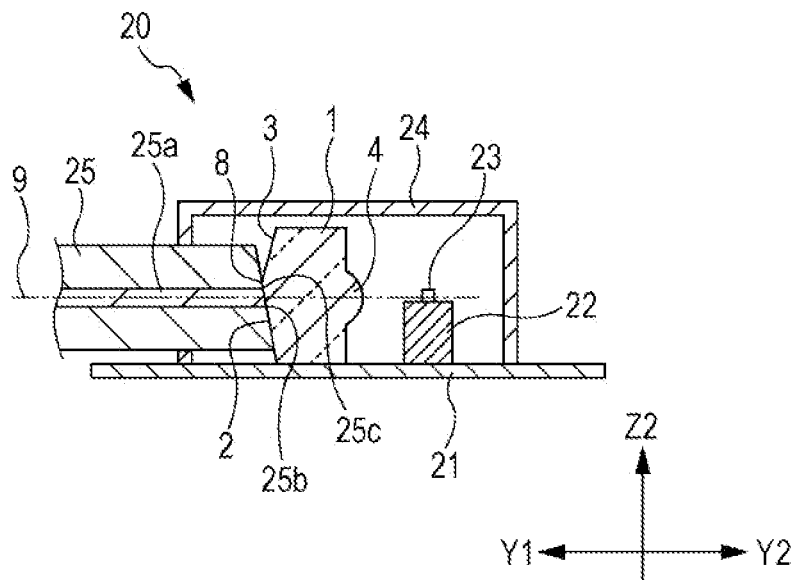
FIG. 8 is a schematic cross-sectional view of an optical communication module to which the inclined surface-equipped lens according to the embodiment is mounted.

Next, an optical communication module to which the inclined surface-equipped lens 1 according to the embodiment is mounted will be described. FIG. 8 shows a schematic cross-sectional view of an optical communication module 20 to which the inclined surface-equipped lens 1 is mounted. In the optical communication module 20, as shown in FIG. 8, a seat 22 and the inclined surface-equipped lens 1 are fixed on a base plate 21, and a light-emitting element 23 is fixed on the seat 22. A housing 24 is fixed on the base plate 21 so as to cover the seat 22, the inclined surface-equipped lens 1, and the light-emitting element 23. An optical fiber 25 is provided so as to extend through the housing 24, and an obliquely-cut surface 25b of the optical fiber 25 is fixed to the first inclined surface 2 of the inclined surface-equipped lens 1 via an optical adhesive or the like (not shown).

When fixing the obliquely-cut surface 25b of the optical fiber 25 to the first inclined surface 2 of the inclined surface-equipped lens 1, the obliquely-cut surface 25b is not restricted by the corner portion 8, since the corner portion 8 is raised outward (in the Y1 direction) and thus the cross section of the inclined surface-equipped lens 1 has a mountain shape having the corner portion 8 as a peak as shown in FIG. 8. In other words, since the corner portion 8 is the peak of the mountain shape, the obliquely-cut surface 25b is moveable in a direction parallel to the first inclined surface 2 without being blocked by the corner portion 8, and it is possible to suitably adjust the optical fiber 25.

In addition, as shown in FIG. 8, the light-emitting element 23, the aspherical lens 4 of the inclined surface-equipped lens 1, and the optical fiber 25 are arranged such that their optical axes 9 coincide with each other. A light beam emitted by the light-emitting element 23 is converged by the aspherical lens 4 on a core end face 25c that is an end face of a core 25a of the optical fiber 25. Then, the light beam converged on the core end face 25c is located only within the first inclined surface 2 which is less inclined.

Since the first inclined surface 2 which is less inclined is provided so as to have a larger area than that of the second inclined surface 3 as described above, the obliquely-cut surface 25b of the optical fiber 25 is easily fixed to the first inclined surface 2. Thus, the obliquely-cut surface 25b of the optical fiber 25 is fixed to the first inclined surface 2 which is less inclined, that is, has a larger area.

In this case, the light beam emitted by the light-emitting element 23 is converged by the aspherical lens 4 on the core end face 25c which is the end face of the core 25a of the optical fiber 25, and the converged light beam is adjusted so as to be located only within the first inclined surface 2 which is less inclined.

By being so adjusted, the light beam emitted by the light-emitting element 23 passes through only the first inclined surface 2 and thus is efficiently optically coupled to the optical fiber.

As shown in FIGS. 1, 2, and 3, in the inclined surface-equipped lens 1, the base 5 is formed in substantially a square prism shape, and its outer shape formed in a direction perpendicular to the optical axis 9 is rectangular. Thus, when mounting the inclined surface-equipped lens 1 to the optical communication module 20, it is possible to place a flat side surface of the base 5 onto the base plate 21 of the optical communication module 20 in a flat manner as shown in FIG. 8. Therefore, it is possible to easily mount the inclined surface-equipped lens 1 to the optical communication module 20.

A metal film is previously formed on the flat side surface of the base 5 which is to be joined to the base plate 21, by a thin film forming technique such as a sputtering method. Then, the metal film and the base plate 21 are joined by means of solder or the like, whereby the inclined surface-equipped lens 1 is fixed on the base plate 21. It should be noted that the metal film is, for example, a three-layered laminated film composed of titanium, platinum, and gold.

Figure 9:
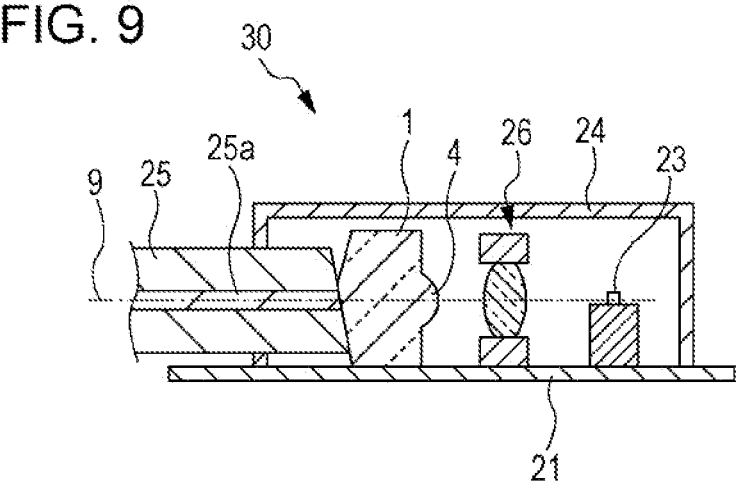
FIG. 9 is a schematic cross-sectional view of a modification of the optical communication module to which the inclined surface-equipped lens according to the embodiment is mounted.

Although the light beam emitted by the light-emitting element 23 is converged by the aspherical lens 4 of the inclined surface-equipped lens 1 on the core end face 25c of the optical fiber 25 in the optical communication module 20 according to the embodiment, its modification is shown in FIG. 9.

In an optical communication module 30 according to the modification, a collimator lens 26 is provided between the light-emitting element 23 and the inclined surface-equipped lens 1 as shown in FIG. 9. The light beam emitted by the light-emitting element 23 is incident as a diffused light beam on the collimator lens 26 and converted to a parallel light beam by the collimator lens 26. Then, the parallel light beam is converged by the aspherical lens 4 of the inclined surface-equipped lens 1 on the core end face 25c of the optical fiber 25. In this manner, the light-emitting element 23 is optically coupled to the optical fiber 25 via the collimator lens 26 and the inclined surface-equipped lens 1.

The inclined surface-equipped lens 1 according to the embodiment is mounted to the optical communication module and the optical communication module has been described as a light-emitting module, but the present invention is not limited thereto. The present invention is also applicable to an optical module such as a light receiving module.

What is claimed is:

1. An inclined surface-equipped lens comprising:
   a base having a front end face and a rear end face;
   an aspherical lens formed on the front end face, the aspherical lens having an optical axis;
   a first inclined flat surface and a second inclined flat surface formed on the rear end face, inclined to have a first inclination angle and a second inclination angle relative to a plane perpendicular to the optical axis, respectively; and
   a ridge portion formed by the first inclined flat surface and the second inclined flat surface meeting each other, the first inclined flat surface and the second inclined flat surface forming a mountain-shaped cross section with the ridge portion as a peak thereof most protruding in a direction of the optical axis, wherein a location of the ridge portion is shifted from the optical axis such that an area of the first inclined flat surface is different from an area of the second inclined flat surface, one of the first and second inclined flat surfaces having a larger area has a smaller inclination angle than that of the other,
   wherein a cross-section of the base perpendicular to the optical axis has a substantially rectangular shape with four sides, the ridge portion forming a straight line parallel to opposing two sides of the four sides of the substantially rectangular shape.

2. The inclined surface-equipped lens according to claim 1, wherein a light beam passing through the lens is located only within either one of the first inclined flat surface or the second inclined flat surface.

3. The inclined surface-equipped lens according to claim 1, wherein a light beam passing through the lens is located only within the one of the first and second inclined flat surfaces having a larger area.

4. An optical module comprising the inclined surface-equipped lens according to claim 1, wherein one of the first and second inclined flat surfaces having a smaller inclination angle is fixed to an obliquely-cut surface of an optical fiber.

5. The inclined surface-equipped lens according to claim 1, wherein the optical axis passes through the one of the first and second inclined surfaces having a larger area.

6. An inclined surface-equipped lens comprising:
   a base having a front end face and a rear end face;
   an aspherical lens formed on the front end face, the aspherical lens having an optical axis;
   a first inclined flat surface and a second inclined flat surface formed on the rear end face, inclined to have a first inclination angle and a second inclination angle with respect to a plane perpendicular to the optical axis, respectively; and
   a ridge portion formed by the first inclined flat surface and the second inclined flat surface meeting each other, a location of the ridge portion being shifted from the optical axis, such that an area of the first inclined flat surface is larger than an area of the second inclined flat surface, wherein the first inclination angle is smaller than the second inclination angle,
   wherein a contour of the base has a substantially rectangular shape in a cross-section taken in the plane perpendicular to the optical axis, and the ridge portion forms a straight line parallel to opposing two sides of the substantially rectangular shape of the base.

7. The inclined surface-equipped lens according to claim 6, wherein the optical axis passes through the first inclined surface.

* * * * *